United States Patent [19]

Mauleon et al.

[11] Patent Number: 4,832,825

[45] Date of Patent: May 23, 1989

[54] METHOD FOR THE INJECTION OF CATALYST IN A FLUID CATALYTIC CRACKING PROCESS, ESPECIALLY FOR HEAVY FEEDSTOCKS

[75] Inventors: Jean-Louis Mauleon, Marly-Le-Roy; Michel Demar, Versailles; Sigaud Jean-Bernard, Vaucresson, all of France

[73] Assignee: Compagnie de Raffinage et de Distribution Total France, Paris, France

[21] Appl. No.: 827,333

[22] Filed: Feb. 7, 1986

[30] Foreign Application Priority Data

Feb. 7, 1985 [FR] France .................. 85 01703

[51] Int. Cl.⁴ .......... C10G 11/05; B01J 29/38
[52] U.S. Cl. .................. 208/157; 208/113; 208/153
[58] Field of Search ........... 208/113, 153, 156, 157, 208/163, 164, 74–76

[56] References Cited

U.S. PATENT DOCUMENTS

| | | | |
|---|---|---|---|
| 3,617,497 | 11/1971 | Bryson | 208/157 X |
| 3,708,420 | 1/1973 | Irvine | 208/156 |
| 3,894,936 | 7/1975 | Owen | 208/156 X |
| 4,197,189 | 4/1980 | Thompson et al. | 208/164 |
| 4,332,674 | 6/1982 | Dean et al. | 208/120 |
| 4,414,101 | 11/1983 | Smith et al. | 208/153 |
| 4,422,925 | 12/1983 | Williams et al. | 208/74 X |
| 4,427,537 | 1/1984 | Dean et al. | 208/157 X |
| 4,427,539 | 1/1984 | Busch et al. | 208/113 X |
| 4,446,009 | 5/1984 | Bartholic | 208/157 X |
| 4,450,241 | 5/1984 | Hettinger, Jr. et al. | 208/113 X |
| 4,479,870 | 10/1984 | Hammershaimb et al. | 208/153 |
| 4,541,922 | 9/1985 | Lomas et al. | 208/113 X |
| 4,541,923 | 9/1985 | Lomas et al. | 208/113 X |

*Primary Examiner*—Glenn Caldarola
*Attorney, Agent, or Firm*—A. Thomas S. Safford

[57] ABSTRACT

The invention relates to a method and apparatus for injecting and conditioning regenerated catalyst particles at the base of a catalytic cracking reactor/elevator below the zone where the feedstock to be cracked is injected to give better uniformity of treatment and control of the effective C/O ratio. A first fluid is injected at a low rate into the reactor below the level where the catalyst particles coming from the regenerator are introduced so as to form a dense phase fluidized bed, and a second fluid is injected at a higher rate substantially above the zone where the catalyst particles coming from the regenerator enter so as to form a homogenized dilute phase fluidized bed of catalyst prior to subsequent contact with the feedstock to be treated.

14 Claims, 3 Drawing Sheets

METHOD FOR THE INJECTION OF CATALYST IN A FLUID CATALYTIC CRACKING PROCESS, ESPECIALLY FOR HEAVY FEEDSTOCKS

The present invention relates to the fluid catalytic cracking of hydrocarbon feedstocks. More particularly, it relates to novel methods and apparatus for injection into the reaction zone of the catalyst and of the feedstock to be cracked. It further relates to the use of such injection apparatus in the catalytic cracking of a heavy feedstock.

It is known that the petroleum industry usually employs cracking processes in which hydrocarbon molecules of high molecular weight and a high boiling point are broken down into smaller molecules boiling in lower temperature ranges suitable for the desired use.

The process which today is used most widely for this purpose is the so-called Fluid Catalytic Cracking (FCC) process. In this type of process, the hydrocarbon feedstock is vaporized and contacted at high temperature with a cracking catalyst that is kept in suspension in the feedstock vapors. After the desired molecular-weight range reduction has been attained by cracking, with a corresponding lowering of the boiling points, the catalyst is separated from the products obtained, stripped, regenerated by combustion of the coke formed, and then again contacted with the feedstock to be cracked.

In processes of this type, the desired lowering of the boiling points is the result of controlled catalytic and thermal reactions, the FCC process being of course carried out in such a way that the cracking unit is in heat balance. In other words, the circulation of hot regenerated catalyst should be such that it is able to meet the various thermal requirements of the reactor section, meaning, in particular, preheating of the liquid feedstock, vaporization of the feedstock, and heat input required by the reactions involved, which overall are endothermic.

The latest developments in the area of catalytic cracking have thus shown that one of the most important parameters of the cracking reaction is linked to the rapidity and uniformity with which the feedstock is contacted with the catalyst particles as well as to the quality of the atomization and vaporization of the feedstock upon its injection into the reaction zone, often called elevator or riser.

As a matter of fact, the feedstocks to be cracked are usually injected into the reaction zone at a temperature which generally ranges from 80° to 400° C. and a relative pressure of from 0.7 to 3.5 bar, while the temperature of the regenerated catalyst reaching that zone may be of the order of 600° to 950° C.

In particular, when feedstocks composed of hydrocarbons having a high boiling point and containing asphaltenes are being processed, the catalyst is injected into the reaction zone at temperatures which may be as high as 950° C. A portion of the quantity of heat so supplied initially permits the instantaneous thermal cracking or shattering of the heaviest molecules to lighter ones. Subsequently, with all of the molecules of the feedstock and all of the catalyst particles having thus reached an equilibrium temperature, the catalytic cracking reaction proceeds by contact between these molecules and the active sites of the catalyst.

However, the many studies conducted by applicants' assignee with a view to improving the heat transfer between the catalyst particles and the feedstock to be treated have shown—that the yields actually obtained with the best-performing cracking unit used designs up to now are below those to be anticipated on the basis of theoretical studies, and—that this difference is due in particular to insufficient control of the effective C/O ratio between the quantity of catalyst C introduced into the reaction zone and the quantity of the feedstock O (for oil) to be cracked.

The present invention thus seeks to provide a method and apparatus for the introduction of catalyst which, due to improved fluidization and conditioning of the catalyst particles in the reaction zone prior to injection of the feedstock, assure better uniformity and better control of the effective C/O ratio.

For greater clarity, the construction of the usual apparatus for introduction of catalysts into the reactor or riser will be outlined below with reference to FIG. 1A of the accompanying drawings.

BRIEF DESCRIPTION OF THE DRAWINGS

In the different figures, similar components are designated by the same reference numerals.

Figure 1A:
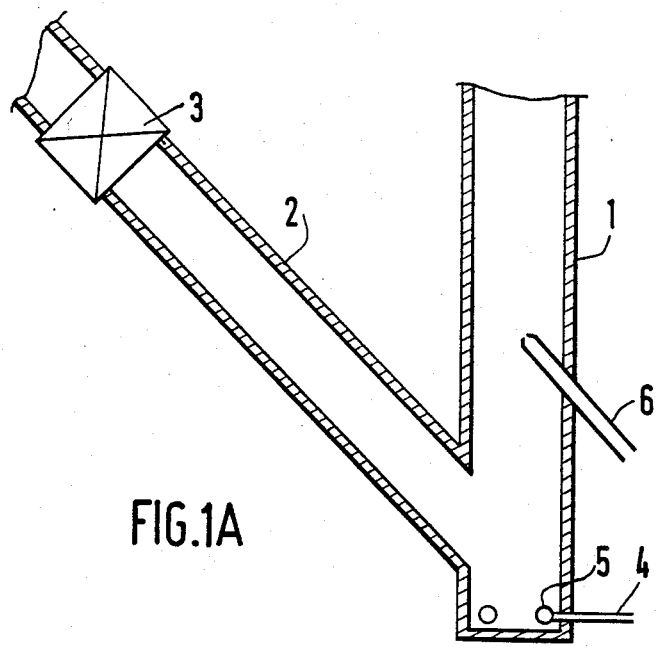
FIG. 1A shows diagrammatically a conventional catalyst introduction apparatus in a fluidized-bed catalytic cracking process.

In conventional apparatus for the introduction of catalyst into the reactor or riser, such as that shown in FIG. 1A, the regenerated catalyst is introduced at the base of the feedstock elevator 1 of the riser type through a line 2 in an amount determined by the opening or closing of a valve 3. The catalyst particles are then lifted toward the top of the riser by injection at the base thereof of a gaseous fluid coming from the line 4, this injection being made by means of a fluid distributor or "diffuser" 5. The feestock to be cracked is introduced at a higher level through the line 6 and flashed by appropriate means in the dense stream of catalyst particles.

The work done by applicants has made it possible to show that the relative differences between the theoretical yields and those actually obtained may be due to irregularities in the flow of catalyst caused by this type of catalyst introduction apparatus.

In fact, with this type of introduction apparatus, aggregations of catalyst particles may form during the transition in the diluted phase of the stream of catalyst particles as the latter have a tendency to arrive in lumps in the line 2 introducing them into the riser. Since the gas stream entering through the line 4 is constant, the diluted stream of catalyst particles lifted into the elevator or riser then oscillates considerably about an average density. Now when the finely atomized feedstock comes into contact with too dense a catalyst stream, an excessively high heat input occurs, which results in additional coking of the catalyst and substantially gas production. Conversely, when the atomized feedstock comes into contact with a catalyst stream that is too dilute, the desired heat transfer does not occur and the desired cracking reactions do not take place.

The present invention seeks to overcome these drawbacks by homogenizing the stream of catalyst introduced into the cracking section of zone by two-stage fluidization at the base of the elevator or riser.

The invention consequently has an embodiment a method of introducing and conditioning regenerated catalyst particles at the base of a catalytic cracking reactor/elevator, below the zone where the feedstock to be cracked is injected, which is characterized in that a first.fluid is injected into the reactor, at a low rate, below the level where catalyst particles coming from the regenerator enter, for the purpose of maintaining a homogeneous dense phase fluidized catalyst bed whose upper portion is disposed above the zone where the catalyst is introduced, and in that a second fluid is injected at a higher rate below said upper portion of the dense phase caatalyst bed but substantially above the zone where the catalyst particles coming from the regenerator enter, for the purpose of forming a homogeneous dilute phase fluidized bed catalyst particles with a constant flow rate above the zone where said second gaseous fluid is injected but below the zone where the feedstock is injected.

The invention has a further embodiment apparatus for the injection and conditioning of regenerated catalyst particles at the base of a vertically disposed catalytic cracking reactor/elevator of the so-called riser type, located below the zone where the feedstock to be cracked is injected, and characterized in that it comprises on the one hand, below the level at which the catalyst particles coming from the regenerator are introduced, a first diffuser for a first gaseous fluid operating at a low rate so as to maintain a homogeneous dense phase fluidized catalyst bed whose upper portion is disposed above the zone where the catalyst is introduced, and, on the other hand, below the upper portion of the dense phase catalyst bed so formed but substantially above the zone where the catalyst particles coming from the regenerator enter, a second diffuser for a second gaseous fluid operating at a higher rate and intended to form a homogeneous dilute phase fluidized bed of catalyst particles above said second diffuser but below the zone where the feedstock is injected.

Figure 1B:
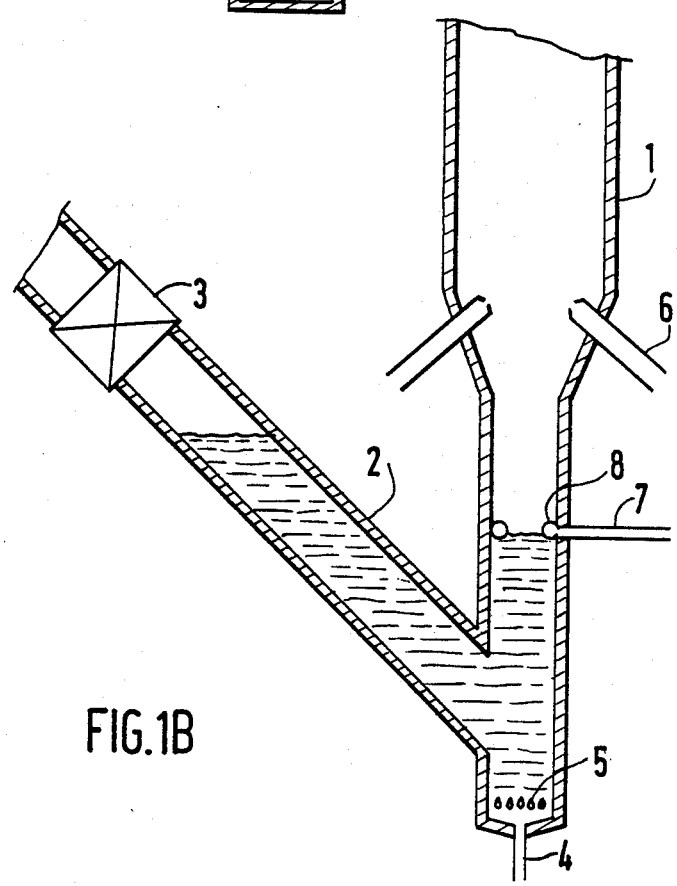
FIG. 1B is an analogous diagram of an apparatus where injection is introduction in accordance with the invention.

One embodiment of such an injection apparatus may be shown in FIG. 1B of the accompanying drawings. In this apparatus, the regenerated catalyst is introduced at the base of the riser 1 through a line 2 in an amount determined by the opening or closing of the valve 3. It is then maintained as a dense phase fluidized bed at the base of the riser by the injection through a first diffuser 5 of a first fluid entering through the line 4. The catalyst so arrayed and maintained in a homogeneous dense phase bed is lifted up then, also homogeneously, into the reaction zone by a new injection of a second fluid entering through the line 7 by means of a second diffuser 8 located in the riser and disposed in the upper portion of the dense phase fluidized catalyst bed.

The feedstock to be cracked is then introduced through the line 6 and flashed by an appropriate device in the resulting diluted and homogeneous stream of catalyst particles, thus permitting the C/O ratio to be precisely and constantly maintained at an appropriate value based on the nature of the feedstock to be treated and on the temperature of the regenerated catalyst.

It goes without saying that the apparatus shown in FIG. 1B imposes no restrictions whatever on the different forms of the apparatus which can embody the present invention.

In fact, the dense phase fluidized catalyst zone, formed by the line 2 through which the catalyst is introduced and by the base of the riser, may be modified in a manner which as such is known, and in particular may have the form of a g along which the gaseous fluid may be introduced by means of a plurality of injection lines taking the place of the diffuser.

A first advantage of the apparatus in accordance with the present invention results from the fact that maintaining a dense phase fluidized catalyst bed at the base of the riser prior to the transition therefore to a dilute phase of the fluidized catalyst bed makes it possible to obtain greater uniformity of density and temperature of the catalyst before it makes contact with the feedstock to be cracked. There is thus less likelihood of collision between the finely atomized droplets of the feedstock and the particles of the catalyst, and less coke will deposit on the surface of the particles, which will therefore retain their activity for the subsequent cracking reaction. The conversion rate of the unit and the selectivity are thus improved.

Furthermore, the phase homogenization of the catalyst particles so effected at the base of the reaction zone makes it possible to use that zone for the introduction of a number of additives designed to improve or facilitate the cracking reaction. These additives may include passivators of vanadium and nickel, or passivators of some of the strongest acid sites or zeolite containing catalyst, which are well known to those skilled in the art and which may be added in the dense catalyst zone in an amount ranging from 0 to 50 ppm, based on the feedstock.

A second advantage of this apparatus is that it permits good contact between a homogeneous stream of catalyst particles and a finely atomized feedstock, which makes possible instantaneous flash vaporization of the latter. Heat transfer takes place almost instantaneously and the cracking reaction sets in forthwith at the requisite temperature. All feedstock molecules therefore undergo a catalytic reaction which takes place at essentially the same severity. With the undesirable thermal cracking reactions thus reduced, it is possible to operate at higher temperatures and to obtain a better conversion rate for the heaviest more refracting feeds as well as better octane number for the gasoline produced. Thus it is also possible to substantially reduce the length of the residence time of the feedstock in the reaction zone, that is to say, to reduce the length of the riser. Such reduction results in a diminution of the deleterious effects of the heavy metals contained in the feedstock, since there is less time for them to be reduced and activated.

A third advantage of the apparatus in accordance with the invention resides in the fact that the composition of the fluid entering through the line 7 and then through the second diffuser 8 may differ from that of the fluid entering through the first diffuser 5. Since the second diffuser 8 is located at a relatively short distance from the zone where the feedstock is injected, the gaseous fluid is apt to contain a considerable proportion of steam, which in the presence of the very hot catalyst will generate some hydrogen without injuring the catalyst. There will then be increased production of gasoline and gas oils during the cracking reaction.

Another advantage of the apparatus of the invention, which stems from the fact that the apparatus makes it possible to process in the catalytic cracking unit feedstock containing very much larger amounts of heavy products and, in particular, of asphaltenes, in that contacting a homogeneous stream of very hot catalyst particles with the finely atomized feedstock of heavy oils permits an instantaneous thermal cracking reaction of the heaviest molecules to smaller molecules to take place without excessive coking of the catalyst particles. The latter, having thus retained their activity, will then permit the catalytic cracking reactions of the smaller molecules so formed to occur in the riser. The conversion rate of the cracking unit will thus be considerably improved and the quantities eventually to be recycled will be smaller.

A further advantage of the apparatus in accordance with the invention results from the fact that because of the reduction of the amount of coke formed during the contact between feedstock and catalyst, regeneration of the catalyst is facilitated in that its temperature as well as its residence time in the regenerator or regenerators is reduced and the possibility of hot spots developing that would be injurious to both the catalyst and the unit is diminished.

In accordance with a particular characteristic of the introduction apparatus of the present invention, the first fluid distributor or diffuser 5 is located in the lower portion of the reaction zone, below the level where the regenerated catalyst particles from the line 2 enter. Said diffuser is constructed by techniques with which those skilled in the art are familiar. It may come in a large variety of configurations and may be provided with a number of orifices that may vary widely. However, it should be designed to prevent the occurrence of channeling or of bursting effects in the dense phase fluidized bed which it creates, while at the same time limiting the pressure drop. Moreover, it should be highly resistant to corrosion, abrasion and thermal stresses.

The gaseous fluid used to obtain the dense phase fluidized catalyst bed at the base of the reaction zone may advantageously consist of hydrocarbons having five or fewer than five carbon atoms or of mixtures thereof. In addition, it may optionally contain up to about 15 percent by volume hydrogen and up to about 10 percent by volume steam.

The conditions of injection of this gaseous fluid will, of course, vary in accordance with the size and weight distribution of the particles of the catalysts used. As a rule, the dense phase homogeneous bed above the first diffuser will be formed by limiting the rate of flow of the gaseous fluid to the range of 0.01 to 0.5 meter/second, and more particularly of 0.03 to 0.3 meter/second, which will permit a fluidized-bed density that generally ranges from 400 to 800 kg/m$^3$ to be obtained.

The height of the dense phase fluidized bed obtained at the base of the reaction zone in accordance with the present invention should be sufficiently great to permit the homogenization of a relatively large quantity of catalyst particles. Nevertheless, this height should be calculated to prevent the occurrence of bursting effects in the dense bed. In practice, the surface of the dense phase fluidized bed will necessarily be disposed above the second diffuser 8, which in turn should be placed a sufficient distance above the level at which the regenerated catalyst piped through the line 2 enters, so that the density of the particles situated near the surface of the dense phase fluidized bed is not disturbed by incoming regenerated particles.

The second diffuser 8 of the injection apparatus of the present invention will therefore be necessarily located above the zone in the reactor or riser where the catalyst enters through the line 2 and, in practice, it will preferably be located at a distance from the upper portion of the intake for line 2 that may be from one to five times the diameter of the elevator at the level of the second diffuser.

In a view of preventing erosion of this diffuser and attrition of the catalyst particles introduced into the riser, the second diffuser is advantageously arranged in the form of a tubular ring whose upper portion is drilled with multiple holes designed to allow the fluid to exit toward the upper part of the reactor.

A certain number of variations of the form of this second diffuser are, of course, within the reach of those skilled in the art and, consequently, are within the scope of the present invention; in particular, the inlet for the gaseous fluid may be executed by substituting for the aforesaid tubular ring lateral orifices, optionally in the form of slots disposed directly on the periphery of the riser. Moreover, the second diffuser may also take the form of one or more tubes, optionally bent, whose orifices are directed upwardly at the central part of the riser. Finally, to accentuate both the mixture of gaseous fluid and catalyst particles and an effective acceleration of the diluted fluidized phase, the shape of the riser may be modified in proximity to the gaseous-fluid inlet to obtain a venturi effect.

The gaseous fluid used to obtain the diluted but homogeneous fluidized bed in the zone located above the second diffuser advantageously consists of the same type of gaseous fluid as that used at the first diffuser. However, as has been pointed out earlier, the composition of the gaseous fluid leaving the second diffuser may be altered by adding to it in particular considerable amounts of steam capable of forming in contact with certain catalysts a portion of the hydrogen required for the rearrangement of the cracked molecules. This fluid may further advantageously contain all or part of the gases, relatively rich in hydrogen or hydrogen compounds, coming from other sectors of the refinery.

Finally, the fluid may advantageously consist in whole or in part of liquids which are readily vaporizable and have boiling points under 250° C., for example. The almost instantaneous vaporization of such liquids makes possible, on the one hand, the volumetric expansion necessary for the desired acceleration of the catalyst particles and, on the other hand, regulation of the temperature at which the catalyst is introduced into the reaction zone through variation of the amount of liquid in the fluid.

In particular, gasolines from different sources may be used as readily vaporizable liquid which can be cracked when the catalyst regeneration temperature is sufficiently high. In addition to the effects mentioned earlier, such cracking also contributes to the production of light olefins.

Thus it was observed, for example, that injection of a light naphtha recycle through the line 7 made it possible to double the production of $C_2$, $C_3$, and $C_4$ olefins.

The superficial velocity downstream of the second diffuser will be substantially higher than that prevailing at the base of the reaction zone, thus permitting the formation of a dilute phase fluidized bed of catalyst particles. Advantageously, that flow rate will be higher than 0.3 meter/second and most often will range from about 1.0 to 10 meters/second.

Finally, the injector 6 will be placed in the riser at a relatively short distance above the second diffuser 8.

However, that distance should be sufficient for prevention of the turbulence generally observed in the transition zone directly above the surface of a dense fluidized bed of catalyst particles. In practice, the distance between the injector and the second diffuser should be at least equal to that of the riser diameter and most often will be from one to five times that diameter.

The injection at 6 of the feedstock to be cracked into the reaction zone 1 will also be carried out by techniques for atomizing a hydrocarbon feedstock into very fine droplets, with which those skilled in the art are familiar. With a view to assuring uniform distribution of the droplets, a plurality of devices for injection by atomization, distributed symmetrically around the riser, is preferably used. Suitable for this purpose are, in particular, devices such as those described in French patent application No. B 84 04 281, filed on Mar. 20, 1984, in the name of applicants' assignee (see also equivalent European patent application Ser. No. 85 400 529.5 filed on Mar. 20, 1985, and now granted under Publication No. 157,691).

The catalysts suitable for use in the apparatus to which the present invention relates include cracking catalysts of the crystalline aluminosilicate type, certain types of silica-alumina, of silica-magnesia and of silica-zirconium, all having relatively high cracking activity, or possessing such activity. The crystalline aluminosilicates may be in the natural state or be prepared synthetically by techniques with which those skilled in the art are familiar. They may be chosen from among the synthetic zeolites or the clays, such as faujasite, certain mordenites, montmorillonite, the bridged calys, the aluminophosphates or the like.

Figure 2:
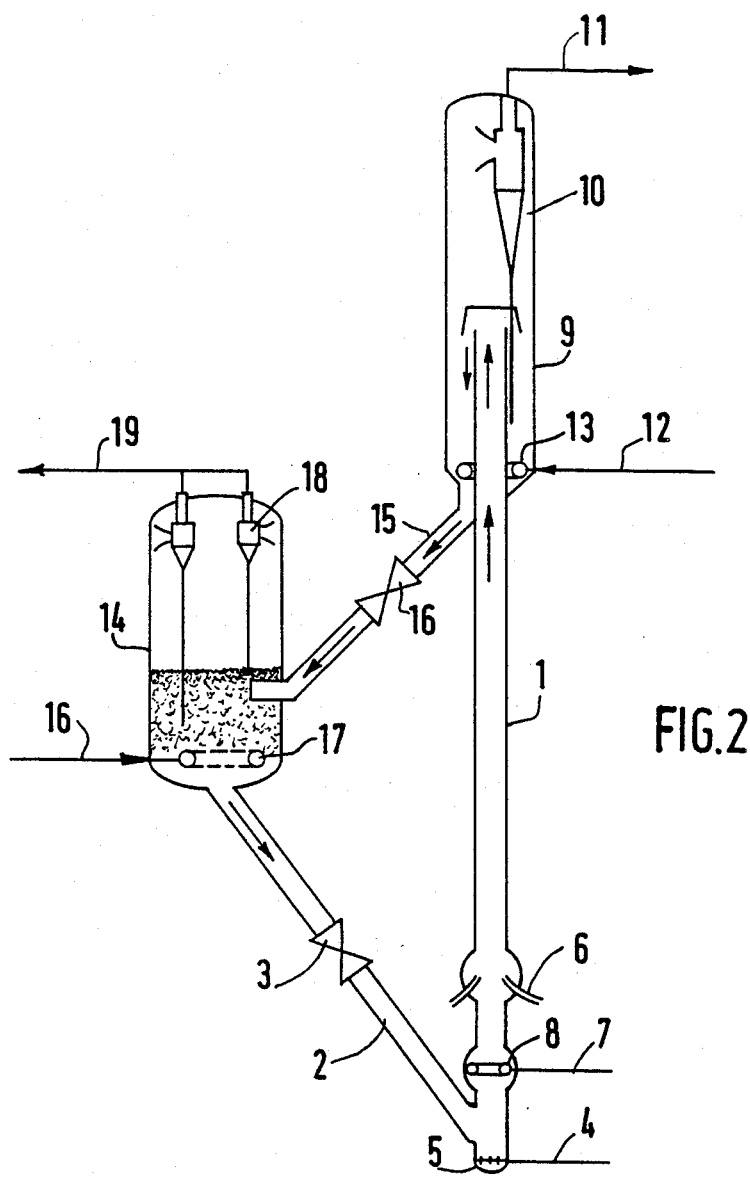
FIG. 2 is a diagram of a catalytic cracking apparatus equipped with a fluid introduction system in accordance with the invention with a single-stage catalyst regeneration chamber.

An apparatus for cracking by the FCC process according to the invention is shown in FIG. 2. The apparatus essentially comprises a column 1, known as feedstock elevator or riser, which is fed at its base, through the line 2, with regenerated catalyst particles in an amount determined by the opening or closing of a valve 3. The temperature and the density of this regenerated catalyst are rendered uniform by injection at the base of the riser, by means of a first diffuser 5, of a first gaseous fluid introduced through the line 4.

The catalyst so arrayed and maintained in a homogeneous dense phase fluidized bed is then lifted up homogeneously into the riser by a new injection by means of a second diffuser 8, located above the regenerated-catalyst intake in the riser, of a second gaseous fluid which may or may not be the same as the first one and which is introduced through the line 7. The feedstock to be cracked is then introduced into the riser by means of an injector 6.

The column 1 terminates at its top in a vessel 9 which may, for example, be concentric with it and in which the cracked feedstock is separated ad the spent catalyst is stripped. The treated feedstock is separated in a cyclone system 10 which is accommodated in the vessel 9, at the top of which a discharge line 11 is provided for the cracked feedstock, while the spent catalyst particles carried over are reinjected at the base of the vessel 9. A line 12 feeds stripping gas, usually steam, to injectors 13 that are uniformly disposed at the base of the vessel 9.

The spent catalyst particles so stripped are discharged at the base of the vessel 9 to a regenerator 14 through a conduit 15 in which a control valve is inserted. In the regenerator 14, the coke deposited on the catalyst particles is burned off by the use of oxygen rich gas such as air injected at the base of the regenerator through a line 16 that feeds evenly spaced injectors 17. The entrained catalyst particles and the combustion gas are separated by cyclones 18, from which the combustion gas is exhausted through a line 19 while the regenerated catalyst particles drop to the base of the regenerator, from where they are recycled through the line 2, equipped with a control valve 3, to the intake of the elevator or riser.

The dimensional and operating characteristics of such an apparatus usually are as follows:

Height of elevator 1: 5 to 40 meters.
Temperature of feedstock to be cracked: 75° to 450° C.
Feed rate to the elevator 1 of feedstock to be treated: 1,000 to 10,000 tons per day.
Feed rate of catalyst to elevator 1: 3 to 50 tons per minute.
Residence time of feedstock in elevator 1: 0.05 to 10 seconds.
Regeneration temperature of catalyst: 650° to 900° C.
Residence time of catalyst in regenerator: 5 to 20 minutes.

The hydrocarbon feedstocks susceptible of being injected into units of the type shown in FIG. 2 comprise, in a general way, hydrocarbons having boiling ranges from 200° to 550° C. or higher, and their gravity may range from 10° to 35° API.

Figure 3:
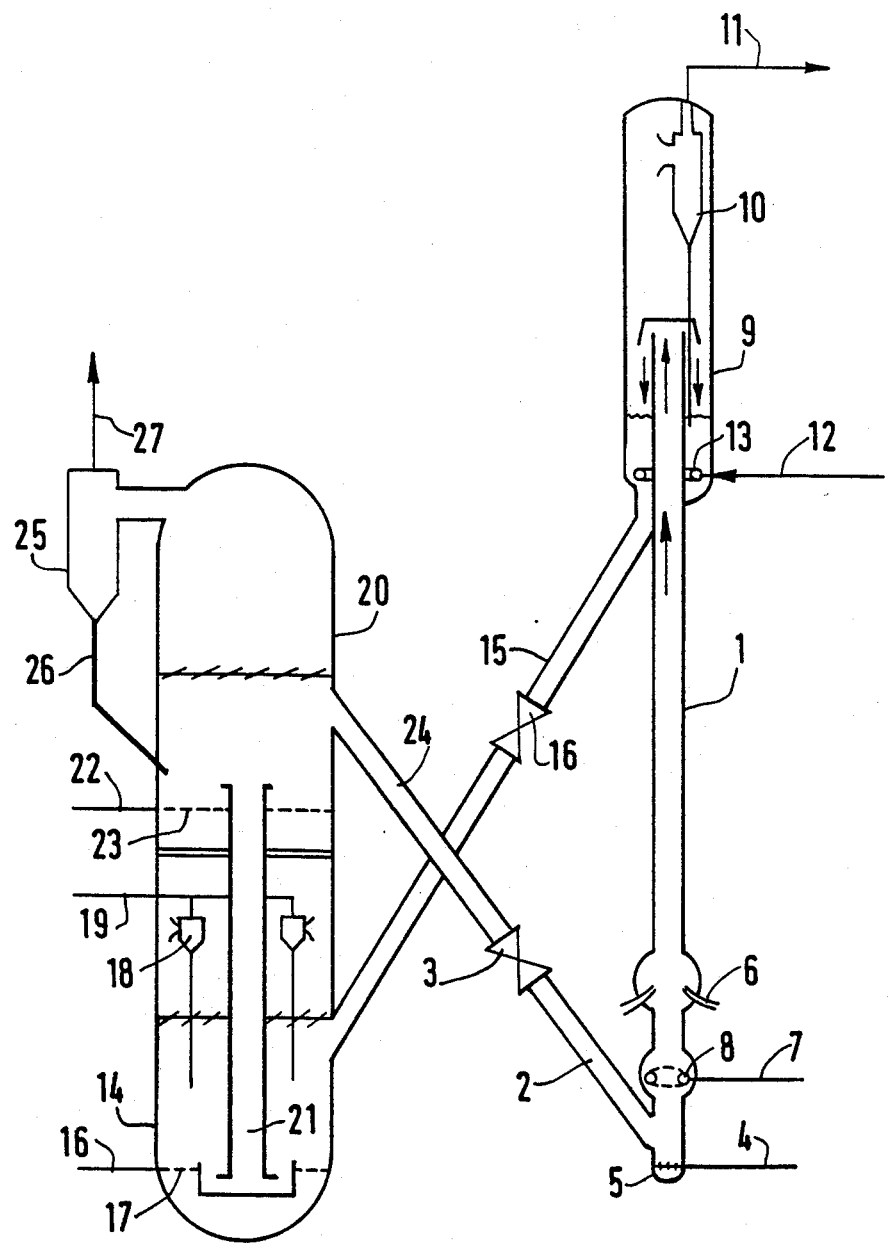
FIG. 3 shows a further catalytic cracking apparatus equipped with an introduction system according to the invention and with a two-stage catalyst regeneration chamber.

FIG. 3 shows another catalytic cracking unit equipped with the injection system of the invention in which a two-stage regeneration chamber is used.

In this figure, the components already described in connection with FIGS. 1 and 2 are designated by the same reference numerals. The regenerator here is of the upward-flow type and comprises two stages 14 and 20.

The spent catalyst, which has already undergone stripping in the vessel 9, is conveyed through the conduit 15 to the lower stage 14 of the regenerator.

Air is fed to this first combustion stage through the line 16, the air being distributed through evenly spaced injectors 17. In this stage, the combustion gas exhausted through the line 19 is separated from entrained partially regenerated catalyst particles by cyclones 18.

The catalyst particles which have undergone a first partial regeneration treatment are then transferred to the second stage 20 of the regenerator through the central conduit 21.

The base of stage 20 is likewise supplied with air, through the line 22 and the injector 23. The regenerated catalyst particles are discharged laterally to a temporary storage space 24 and recycled through the line 2 to the intake of the elevator. The combustion gases exhausted at the top of stage 20 are treated in an external cyclone system 25 internally lined and, which therefore is capable of withstanding the high temperatures resulting from complete combustion of the coke and at the base of which the catalyst particles are returned to stage 20 through the pipe 26 while the combustion gases are exhausted through the line 27.

The catalytic cracking unit, equipped with a two-stage upward-flow regenerator and an injection apparatus in accordance with the invention, offers the following advantages:

—Double regeneration of the catalyst, which permits complete combustion of the coke without substantial alteration of the catalytic properties;
—no limitation of the temperature of the second regenerator, which permits the catalyst to reach the temperature required for vaporization of the feedstock, especially when the latter is a heavy feedstock;

—improvement of the thermal stability of the catalyst and of its resistance to metals.

These heavy hydrocarbon feedstocks which are susceptible of being injected into cracking units of the type illustrated in FIG. 3 may contain hydrocarbons having a boiling point of up to 750° C. and higher and whose gravity may range from 10° to 35° API.

The example which follows is intended to illustrate the invention and therefore has no limiting character whatever.

EXAMPLE

Two catalytic cracking tests were conducted with the same hydrocarbon feedstock in a two-regenerator unit of the type described in FIG. 3. In contrast to the first test, in which a conventional apparatus for injection of the catalyst particles and of the feedstock to be cracked was used, the second test was carried out by means of an apparatus in accordance with the invention which permitted the injection of the feedstock to be cracked into a diluted and homogeneous fluidized bed of catalyst particles.

Nature of feedstock treated:

| Gravity | 22.8° API |
|---|---|
| Sulfur | 0.9 wt. % |
| Total nitrogen | 0.3 wt. % |
| Vanadium | 9 ppm |
| Nickel | 4 ppm |
| Conradson carbon | 4.6 wt. % |
| Nondistillable at 560° C. | 26 vol. % |

The operating conditions during these two tests were as follows:

| | First test with conventional injection | Second test with injection according to the invention |
|---|---|---|
| Catalyst injection temperature, °C. | 771 | 757 |
| Feedstock injection temperature, °C. | 210 | 255 |
| Temperature of riser, °C. | 527 | 527 |
| Type of catalyst | Ultrastable zeolite | Ultrastable zeolite |
| Superficial velocity of gases after first diffuser | 0.03 m/s | 0.2 m/s |
| Increase in superficial velocity due to second diffuser | None | 2.0 m/s |
| Apparent C/O ratio | 6.0 | 6.2 |

The results presented below show that the apparatus in accordance with the invention permits obtaining from a heavy feedstock (containing 4.6 wt. % Conradson carbon) better selectivity for gasoline and light distillate as well as an appropriate reduction in coke, and hence improved catalyst stability and a reduction in fresh makeup catalyst.

| | First test | Second test |
|---|---|---|
| Dry gas, wt. % | 5.2 | 4.1 |
| Feedstock to be alkylated, vol. % | 24.0 | 24.4 |
| Gasoline, vol. % | 53.3 | 58.9 |
| Light cutter stock, vol. % | 20.4 | 18.7 |
| Heavy cutter stock, vol. % | 7.4 | 6.8 |
| Coke, wt. % | 7.3 | 6.9 |
| Conversion | | |
| 220° C., vol. % | 72.2 | 74.5 |
| 355° C., vol. % | 92.6 | 93.2 |
| Selectivity for gasoline, vol. % | 73.8 | 79.1 |

We claim:

1. A method of injecting and conditioning regenerated catalyst particles at the base of a catalytic cracking reactor below the reaction zone where the hydrocarbon feedstock to be cracked is injected, comprising flowing catalyst particles from a regenerator to a catalyst feed inlet zone in a lower portion of said reactor, injecting a first gaseous fluid into the reactor at a first injection zone at a low enough rate below the level of said inlet zone where the catalyst particles coming from the regenerator enter such that a homogeneous dense phase fluidized catalyst bed is maintained whose upper portion is situated above said inlet zone, and injecting a second gaseous fluid into the reactor at a second injection zone at a high enough rate below said upper portion of the dense phase catalyst bed but substantially above the inlet zone where the catayst particles coming from the regenerator enter such that a homogeneous dilute phase fluidized bed of catalyst particles is formed above the second injection zone but below the reaction zone where the feedstock is injected.

2. The method of injecting and conditioning according to claim 1, wherein said first and second fluids containing hydrocarbons having one to five carbon atoms, or of mixtures of such hydrocarbons.

3. The method of injecting and conditioning according to claim 2, wherein said first and second fluids further contain not more than 15 volume percent hydrogen and/or not more than 10 volume percent steam.

4. The method of injecting and conditioning according to claim 3, wherein said second fluid contains substantial proportions of steam and has a composition differing from that of said first fluid.

5. The method of injecting and conditioning according to claim 3, wherein said second fluid contains readily vaporizable liquids with a boiling point of under 250° C.

6. The method of injecting and conditioning according to claim 1, wherein the flow rate of said first fluid upon injection ranges from 0.01 to 0.5 meter/second, and the superficial velocity of said second fluid downstream of the zone where said second fluid is injected is higher than 0.3 meter/second.

7. The method of injecting and conditioning according to claim 1, wherein the dense and homogeneous fluidized catalyst bed has a density in a range sufficient to form a discrete surface.

8. The method of injecting and conditioning according to claim 1, wherein said second fluid is injected below said upper portion of the dense catalyst bed but at a distance above the one where the catalyst particles coming from the regenerator enter that is from one to five times the diameter of the reactor at the level of injection.

9. The method of injecting and conditioning according to claim 1, wherein the feedstock to be cracked is injected into a zone located above the zone of injection of said second fluid at a distance that is greater than the diameter of the reactor at the level of injection of the feedstock to be cracked.

10. The method according to claim 1, wherein said first and second fluids are essentially inert gases relative to the cracking within said reactor.

11. The method according to claim 1, wherein said first and second fluids are essentially at least one diluent and/or inert gases relative to the cracking within said reactor.

12. The method of injecting and conditioning according to claim 1, wherein the flow rate of said first fluid upon injection ranges from 0.03 to 0.3 meter/second, and the superficial velocity of said second fluid downstream of the zone where said second fluid is injected is higher than 0.3 meter/second.

13. The method of injecting and conditioning according to claim 1, wherein the flow rate of said first fluid upon injection range from 0.03 to 0.3 meter/second, and the superficial velocity of said second fluid downstream of the zone where said second fluid is injected is from higher than 1.0 to 10 meter/second, and said feedstock is injected substantially exclusively above said dense phase catalyst bed.

14. A method of injecting and conditioning regenerated catalyst particles at the base of a catalytic cracking reactor below the reaction zone where the hydrocarbon feedstock to be cracked is injected, comprising flowing catalyst particles from a regenerator to a catalyst feed inlet zone in a lower portion of said reactor, injecting a first gaseous fluid into the reactor at a first injection zone at a low enough rate below the level of said inlet zone where the catalyst particles coming from the regenerator enter such that a homogeneous dense phase fluidizied catalyst bed capable of forming a discernible upper surface is maintained whose upper portion is situated above said inlet zone, and injecting a second gaseous fluid into the reactor at a second injection zone at a high enough rate below where the discernible upper surface of the dense phase catalyst bed would form but substantially above the inlet zone where the catalyst particles coming from the regenerator enter such that a homogeneous dilute phase fluidized bed of catalyst particles moving at a constant flow rate is formed above the second injection zone but below the reaction zone where the feedstock is injected.

* * * * *